US012679963B2

(12) United States Patent
Xu et al.

(10) Patent No.: US 12,679,963 B2
(45) Date of Patent: *Jul. 14, 2026

(54) RUBBER COMPOSITION, AND FOAMED RUBBER PRODUCT USING THE SAME

(71) Applicant: HANGZHOU XINGLU TECHNOLOGIES CO., LTD, Hangzhou (CN)

(72) Inventors: Tao Xu, Hangzhou (CN); Zhi Sheng Fu, Hangzhou (CN); An Yang Wu, Hangzhou (CN)

(73) Assignee: HANGZHOU XINGLU TECHNOLOGIES CO., LTD, Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/477,524

(22) PCT Filed: Jan. 12, 2018

(86) PCT No.: PCT/CN2018/072368
§ 371 (c)(1),
(2) Date: Jul. 11, 2019

(87) PCT Pub. No.: WO2018/130196
PCT Pub. Date: Jul. 19, 2018

(65) Prior Publication Data
US 2020/0123362 A1      Apr. 23, 2020

(30) Foreign Application Priority Data

Jan. 13, 2017    (CN) .......................... 201710025139.5
Jan. 10, 2018    (CN) .......................... 201810020851.0

(51) Int. Cl.
| | |
|---|---|
| *C08L 23/16* | (2006.01) |
| *B60C 1/00* | (2006.01) |
| *B60C 7/10* | (2006.01) |
| *C08J 9/10* | (2006.01) |
| *C08J 9/14* | (2006.01) |
| *C08L 23/06* | (2006.01) |

(52) U.S. Cl.
CPC .............. *C08L 23/16* (2013.01); *B60C 1/00* (2013.01); *B60C 7/1015* (2021.08); *C08J 9/103* (2013.01); *C08J 9/105* (2013.01); *C08J 9/142* (2013.01); *C08L 23/06* (2013.01); *B60C 2200/12* (2013.01); *C08J 2203/04* (2013.01); *C08J 2203/184* (2013.01); *C08J 2203/204* (2013.01); *C08J 2323/06* (2013.01); *C08J 2323/16* (2013.01); *C08J 2423/06* (2013.01); *C08J 2423/16* (2013.01); *C08L 2203/14* (2013.01); *C08L 2205/025* (2013.01); *C08L 2205/03* (2013.01); *C08L 2312/00* (2013.01)

(58) Field of Classification Search
CPC ............ C08L 23/16; C08L 23/06; C08J 9/103
See application file for complete search history.

(56) References Cited

U.S. PATENT DOCUMENTS

| | | | | |
|---|---|---|---|---|
| 3,470,119 | A | * 9/1969 | Adams | ....................... C08J 9/10 |
| | | | | 521/143 |
| 3,806,558 | A | 4/1974 | Fischer | |
| 4,128,523 | A | 12/1978 | Britton et al. | |
| 5,866,663 | A | * 2/1999 | Brookhart | ............. C08F 210/02 |
| | | | | 526/170 |
| 6,103,658 | A | 8/2000 | Mackenzie et al. | |
| 6,660,677 | B1 | * 12/2003 | Mackenzie | .......... C07D 233/96 |
| | | | | 502/158 |
| 10,717,840 | B2 | * 7/2020 | Aoki | .......................... B32B 5/18 |
| 11,242,450 | B2 | * 2/2022 | Xu | .......................... C08K 3/013 |
| 11,479,661 | B2 | * 10/2022 | Xu | ......................... E01D 19/041 |
| 12,060,476 | B2 | * 8/2024 | Xu | .......................... C08K 3/013 |
| 12,152,134 | B2 | * 11/2024 | Xu | ........................ C08K 5/0016 |
| 12,173,144 | B2 | * 12/2024 | Xu | .......................... C08L 23/06 |
| 2005/0084629 | A1 | * 4/2005 | Gopalan | ................. B60J 10/265 |
| | | | | 428/31 |
| 2006/0074177 | A1 | 4/2006 | Dharmarajan et al. | |
| 2006/0142437 | A1 | * 6/2006 | Hakuta | .................... C08K 5/05 |
| | | | | 524/81 |
| 2008/0188600 | A1 | * 8/2008 | Westwood | .............. C08L 23/16 |
| | | | | 524/81 |

(Continued)

FOREIGN PATENT DOCUMENTS

| | | |
|---|---|---|
| CN | 1511172 A | 7/2004 |
| CN | 101112793 A | 1/2008 |

(Continued)

*Primary Examiner* — Irina Krylova

(74) *Attorney, Agent, or Firm* — Ingrassia, Fisher & Lorenz, LLP

(57) ABSTRACT

The present invention discloses a rubber composition, a processing method thereof, and a foamed rubber product produced by the rubber composition and a production method thereof. The rubber composition comprises a rubber matrix and essential components, wherein, based on 100 parts by weight of the rubber matrix, the rubber matrix comprises a branched polyethylene with a content represented as A, in which 0<A≤100 parts; and an EPM and an EPDM with a total content represented as B, in which 0≤B<100 parts, and the essential components comprises 0.5-10 parts of a crosslinking agent, and 1.5-25 parts of a foaming agent. The rubber composition is useful in the production of sponge seal strip, foamed rubber compound of high expansion ratio, shock absorbing foamed rubber sheet, light-colored high-strength foamed sheet, foam-solid composite seal strip, and solid cycle tires internally filled with foamed elastomer. The branched polyethylene replaces a part or all of the ethylene-propylene rubber in the foaming rubber composition, which can increase the melt strength, the foamability and particularly the pre-foamability of the rubber composition, and make the rubber product has a lower compression set.

11 Claims, No Drawings

(56)                  References Cited

U.S. PATENT DOCUMENTS

| | | | | |
|---|---|---|---|---|
| 2012/0252917 A1* | 10/2012 | Kisin | ............... | C08L 23/0815 |
| | | | | 521/140 |
| 2015/0166755 A1* | 6/2015 | Kim | ........................ | C08K 5/09 |
| | | | | 521/139 |
| 2015/0291823 A1* | 10/2015 | Fu | ........................... | H01B 3/28 |
| | | | | 428/375 |
| 2016/0208060 A1* | 7/2016 | Nishiguchi | ............. | C08J 3/226 |
| 2019/0330456 A1* | 10/2019 | Xu | ........................ | C08K 3/013 |
| 2019/0338109 A1* | 11/2019 | Xu | ........................ | C08L 23/06 |
| 2019/0338110 A1* | 11/2019 | Xu | ........................ | C08K 5/0016 |
| 2019/0359805 A1* | 11/2019 | Xu | ........................ | C08K 3/36 |
| 2019/0359806 A1* | 11/2019 | Xu | ........................ | F16F 1/3605 |
| 2019/0367717 A1* | 12/2019 | Xu | ........................ | B29D 29/06 |
| 2020/0123353 A1* | 4/2020 | Xu | ........................... | B32B 1/08 |

FOREIGN PATENT DOCUMENTS

| | | | | |
|---|---|---|---|---|
| CN | 101531725 | A | | 9/2009 |
| CN | 101812145 | A | | 8/2010 |
| CN | 102245699 | A | | 11/2011 |
| CN | 102329461 | A | | 1/2012 |
| CN | 102827312 | A | | 12/2012 |
| CN | 102892827 | A | | 1/2013 |
| CN | 103980596 | | * | 8/2014 |
| CN | 104926962 | A | | 9/2015 |
| CN | 105175968 | A | | 12/2015 |
| DE | 19822819 | | * | 11/1999 |
| WO | 0157101 | A | | 8/2001 |
| WO | 2009035885 | A | | 3/2009 |
| WO | WO2015046476 | | * | 4/2015 |
| WO | WO2016152878 | | * | 9/2016 |

* cited by examiner

RUBBER COMPOSITION, AND FOAMED RUBBER PRODUCT USING THE SAME

CROSS REFERENCE TO RELATED APPLICATIONS

The present application is the U.S. national phase of and claims priority to International Patent Application No. PCT/CN2018/072368 filed Jan. 12, 2018, which claims the benefit of priority from China National application No. 201710025139.5, filed on Jan. 13, 2017 and China National application No. 201810020851.0, filed on Jan. 10, 2018, the entire content of each of which is incorporated herein by reference into the present disclosure as if fully set forth herein.

TECHNICAL FIELD

The present invention relates to the technical field of rubbers, and in particular to a rubber composition and a processing method thereof. The present invention also relates to use of the rubber composition in foamed products, and a method for producing a foamed rubber product with the rubber composition, including, but not limited to, sponge seal strip, foamed material of high expansion ratio, shock absorbing foamed rubber sheet, light-colored high-strength foamed sheet, foam-solid composite seal strip, and solid cycle tire filled with foamed elastomer.

BACKGROUND

The vulcanization systems for foamed materials of ethylene-propylene rubbers include mainly sulfur and peroxide vulcanization systems. When a sulfur vulcanization system is used, the foamed material is formed to have a crosslinked structure mainly composed of polysulfide bonds, and has a high tensile strength and a high tear strength, but poor heat and aging resistance. When a peroxide vulcanization system is used, the foamed material is formed to have single carbon-carbon crosslink bonds, and has excellent heat and aging resistance, high compression set resistance (good stress relaxation stability), and comparable elongation at break to that of the foamed materials formed using a sulfur vulcanization system. Therefore, it is preferable to use a peroxide vulcanization system to prepare a high-performance foamed material having high heat and aging resistance and high compression set resistance; however, problems of lowered tensile strength and tear strength also occur.

Ethylene-propylene rubbers are a kind of synthetic rubbers with a saturated molecular backbone, and include ethylene-propylene monomer (EPM) and ethylene-propylene-diene monomer (EPDM), both of which have good aging resistance. EPDM is commonly used in the ethylene-propylene rubber products. However, since EPDM contains a third monomer with a molecular chain having a double bond and EPM has a completely saturated molecular chain, EPM has more excellent aging resistance. Therefore, in a situation where a higher requirement is raised for the aging resistance, it is a common technical solution to use EPM in combination to improve the aging resistance of EPDM. However, the mechanical strength of EPM is low, which affects the overall physical and mechanical properties.

EPM is a copolymer of ethylene and propylene, which is a copolymer of ethylene and an $\alpha$-olefin. The copolymer of ethylene and an $\alpha$-olefin is a polymer containing only carbon and hydrogen elements and having a saturated molecular chain. The common types of carbon atoms found in such polymers generally include primary, secondary and tertiary carbons, in which the tertiary carbon is most susceptible to hydrogen abstraction to form a free radical. Accordingly, the proportion of tertiary carbon atoms in all carbon atoms is generally considered to be a major factor affecting the aging resistance of ethylene/$\alpha$-olefin copolymers. The lower the proportion is, the better the aging resistance will be. The proportion can be expressed by the degree of branching. For example, EPM having a propylene content of 60% by weight can be calculated to contain 200 propylene units, that is, 200 tertiary carbon atoms or 200 methyl branches, per 1000 carbon atoms, so the degree of branching is 200 branches/1000 carbon atoms. EPM usually has an ethylene content of 40-65% or 40-60% by weight, so the degree of branching is generally in the range of 117-200 branches/1000 carbon atoms or 133-200 branches/1000 carbon atoms. This degree of branching is considered to be higher than that of other common ethylene/$\alpha$-olefin copolymers.

In the prior art, the $\alpha$-olefin in the common ethylene/$\alpha$-olefin copolymers may include, in addition to propylene, an $\alpha$-olefin having a carbon number of not less than 4, which may be selected from a $C_4$-$C_{20}$ $\alpha$-olefin, and is generally selected from 1-butene, 1-hexene and 1-octene. If the degree of branching of an ethylene/$\alpha$-olefin copolymer is too low, the melting point and crystallinity are too high, so it is not suitable for use as a rubber component. If the degree of branching is too high, the content of $\alpha$-olefin is high, which leads to a higher process difficulty and raw material cost, and a lower operability and economical efficiency. In the prior art, a polyolefin obtained by copolymerizing ethylene with 1-butene or ethylene with 1-octene can be referred to as a polyolefin plastomer or a polyolefin elastomer according to the magnitudes of crystallinity and melting point. Due to their proper crystallinity and melting point, some polyolefin elastomer brands can be well used in combination with an ethylene-propylene rubber and have a low degree of branching, so they are considered to be an ideal material for improving the aging resistance of ethylene-propylene rubbers, and can be used in place of ethylene-propylene rubbers to some extent. Since an ethylene/1-octene copolymer has more flexible molecular chain, higher rubber elasticity, and better mechanical performance than an ethylene/1-butene copolymer, the polyolefin elastomer commonly used in rubber products is generally a copolymer of ethylene and 1-octene at present, in which the octene content in percentages by weight is generally not higher than 45%, and more generally not higher than 40%, and the corresponding degree of branching is generally not higher than 56 branches/1000 carbon atoms, and more generally not higher than 50 branches/1000 carbon atoms, which is much lower than the degree of branching of EPM. Therefore, the ethylene/1-octene copolymer has excellent aging resistance and good physical and mechanical properties.

Rubbers are usually used after cross-linking. Among common cross-linking methods for ethylene-propylene rubbers, peroxide cross-linking or radiation cross-linking can be suitably used for a copolymer of ethylene and an $\alpha$-olefin, both of which mainly comprising: forming a tertiary carbon radical by hydrogen abstraction from a tertiary carbon and then creating a carbon-carbon crosslink by free radical bonding. However, an ethylene/1-octene copolymer (hereinafter referred to as POE) has a low number of tertiary carbon atoms and has a longer branch attached to the tertiary carbon atom, so the steric hindrance is large, and the free radical reaction is difficult to occur, resulting in difficulty in crosslinking, thus affecting the processing efficiency and product performance. For example, the compression set resistance is unsatisfactory.

Therefore, there is currently a need for a better technical solution, which can improve the aging resistance of ethylene-propylene rubbers while the rubber composition has good physical and mechanical properties and cross-linking performances, and is expected to behave well with respect to particular functional performances of foamed rubber products (for example, compression set resistance and so on).

Moreover, the technology critical for the preparation of foamed rubber materials is to solve the problem of matching the rubber vulcanization with the decomposition rate of the foaming agent. In order to achieve a good match, the rubber compound is required to have a degree of pre-crosslinking that reaches 30% of the degree of complete vulcanization of the rubber before the foaming agent is thermally decomposed. Therefore, the pre-vulcanization stage of the rubber is the most critical step, which determines whether a suitable cell structure can be formed and determines the density of the foamed material. In a conventional rubber foaming process, the traditional method is to achieve rapid pre-crosslinking of the rubber by adding an ultra-fast accelerator to the rubber. However, this method is difficult to achieve the matching of vulcanization and foaming. A two-step molding process is commonly used at present, that is, a first molding is performed for 20-50 min at a low temperature (120-140° C.), so that the rubber compound has a certain degree of pre-crosslinking and starts to partially foam, and then the system is secondarily heated in a mold with a specification that is 20-50% larger than the previous mold, such that the foaming agent is completely decomposed, and the rubber compound is vulcanized and formed.

In order to obtain good heat resistance, aging resistance and compression set resistance, a peroxide curing system is used for some foamed materials of ethylene-propylene rubbers, and the foamed material is formed to have single carbon-carbon crosslink bonds. However, compared with the sulfur vulcanization system, there are also problems that the tensile strength and the tear strength are lowered, and it is difficult to pre-vulcanize at a low temperature of 120 to 140° C.

SUMMARY

In view of the problems in the prior art, the present invention provides a rubber composition and a processing method thereof. The present invention also provides a method for producing a foamed material by using the rubber composition, in which branched polyethylene has a degree of branching of not less than 50 branches/1000 carbon atoms is used to replace a part or all of the ethylene-propylene rubber. It is expected to improve the technical defects that the existing foamed materials prepared with rubbers are difficult to have both good heat and aging resistance and mechanical properties, and a peroxide based crosslinking system is used due to the presence of branched polyethylene. The present invention also provides a vulcanization process, which combines the low-temperature radiation pre-vulcanization process with the high-temperature peroxide vulcanization and foaming process to overcome the difficulty of the peroxide vulcanization system in pre-vulcanization at low temperature.

In order to achieve the above object, the following technical solution is adopted in the present invention. A rubber composition comprises a rubber matrix and essential components.

4

The rubber matrix comprises a branched polyethylene with a content represented as A, in which 0<A≤100 parts, and an EPM and an EPDM with a total content represented as B, in which 0≤B<100 parts; and based on 100 parts by weight of the rubber matrix, the essential components comprise 0.5 to 10 parts of a crosslinking agent, and 1.5 to 25 parts of a foaming agent. The branched polyethylene has a degree of branching of not less than 50 branches/1000 carbon atoms, a weight average molecular weight of not less than 50,000, and a Mooney viscosity ML (1+4) at 125° C. of not less than 2.

In the prior art, "branched polyethylene" refers to, in addition to an ethylene homopolymer having branches, a saturated vinyl copolymer having branches, for example, an ethylene-α-olefin copolymer, which may be POE. Although POE performs well in physical and mechanical properties and aging resistance, the cross-linking performances are less good. Therefore, although the branched polyethylene of the present invention can include both a branched ethylene homopolymer and POE, it is preferred that the branched polyethylene comprises a high proportion of or exclusively a branched ethylene homopolymer. In a preferred embodiment of the present invention, the branched polyethylene comprises exclusively a branched ethylene homopolymer.

In the further elaboration of the technical solution of the present invention, the branched polyethylene used is a branched ethylene homopolymer unless otherwise particularly specified.

The branched polyethylene used in the present invention is a kind of ethylene homopolymer having a degree of branching of not less than 50 branches/1000 carbon atoms, which may also be referred to as Branched Polyethylene or Branched PE. Currently, the synthesis method comprises mainly homopolymerizing ethylene following a "chain walking mechanism" in the presence of a late transition metal catalyst, where the late transition metal catalyst is preferably an (α-diimine)nickel/palladium catalyst. The nature of the chain walking mechanism refers to the fact that a β-hydrogen elimination reaction and a re-insertion reaction tend to occur in the polymerization of an olefin in the presence of a late transition metal catalyst, for example, an (α-diimine)nickel/palladium catalyst, thereby causing branching. The branches pendant to the backbone of such branched polyethylene may have different numbers of carbon atoms, and specifically 1 to 6 or more carbon atoms.

The production cost of an (α-diimine) nickel catalyst is significantly lower than that of an (α-diimine) palladium catalyst, and the (α-diimine) nickel catalyst has a high rate and high activity in catalyzing the polymerization of ethylene, and is thus more suitable for industrial application. Therefore, in the present invention, an (α-diimine) nickel catalyst is preferably used in the production of branched polyethylene through catalytic polymerization of ethylene.

The degree of branching of the branched polyethylene used in the present invention is preferably 50 to 130 branches/1000 carbon atoms, further preferably 60 to 130 branches/1000 carbon atoms, and further preferably 60 to 116 branches/1000 carbon atoms. The degree of branching is between that of POE and EPM, constituting a new technical solution that is different from the prior art. Therefore, the rubber matrix of present invention has both excellent aging resistance and good cross-linking performances.

The cross-linking performances include factors such as crosslinking density and crosslinking rate, and are the specific manifestations of the cross-linking ability of the rubber matrix in the processing process.

The branched polyethylene used in the present invention preferably has a methyl branch content of 40% or more or 50% or more, and has a similarity in structure with EPM. In terms of the crosslinking ability, the degree of branching (the content of tertiary carbon atom) and the steric hindrance around the tertiary carbon atom are the two main factors affecting the crosslinking ability of a saturated polyolefin. Compared with the EPM rubber, the branched polyethylene used in the present invention has a low degree of branching, and since the branched polyethylene has branches with the carbon number of not less than 2, the steric hindrance around the tertiary carbon atom of the branched polyethylene used in the present invention is theoretically greater than that of the EPM rubber. Taking the two factors into account, it can be inferred that the crosslinking ability of the branched polyethylene used in the present invention is weaker than that of the EPM rubber and further weaker than that of the EPDM rubber. However, the actual crosslinking ability of the partially branched polyethylene used in the present invention is close to, and can even be equal to or better than that of the EPDM rubber. This means that the rubber composition of the present invention can achieve a good aging resistance while the crosslinking ability is not weakened, and can even have excellent crosslinking performances to achieve unexpected beneficial effects.

This may be explained by the fact that there may be an appropriate number of secondary branch structures on the branched polyethylene used in the preferred technical solution of the present invention. The so-called secondary branch structure refers to a branch structure that further exists on a branch, which is formed in the chain walking process. This structure is also called "branch-on-branch". Because the steric hindrance around the tertiary carbon atoms of the secondary branch is low, a cross-linking reaction is more likely to occur. Having a secondary branch structure is a significant distinct of the branched polyethylene used in the preferred embodiment of the present invention from EPM or the conventional ethylene-α-olefin copolymer in the prior art.

It is a new technical solution to improve the crosslinking ability of a saturated polyolefin elastomer by using the secondary branch structure with lower steric hindrance. According to the technical solution of the present invention, it is also considered to be within the technical protection of the present invention to include a vinyl copolymer having a secondary branch structure or other saturated hydrocarbon polymers in the rubber matrix. The vinyl copolymer refers to a copolymer of ethylene with a branched α-olefin and has a secondary branch structure. The branched α-olefin may be selected from the group consisting of isobutene, 3-methyl-1-butene, 4-methyl-1-pentene, 3-methyl-1-pentene, 2-methyl-1-heptene, 3-methyl-1-heptene, 4-methyl-1-heptene, 5-methyl-1-heptene, and 6-methyl-1-heptene, and the comonomer may also include a common linear α-olefin.

It is generally believed in the prior art that the branched polyethylene produced in the presence of an (α-diimine) nickel catalyst is difficult to have a secondary branch structure that is at least difficult to fully identify, and the technical solution of the present invention also provides a new idea for analyzing the structure of the branched polyethylene.

Compared with the ethylene-propylene rubber, when branched polyethylene has an appropriate number of secondary branch structures, the crosslinking point of the branched polyethylene can be generated on the tertiary carbon of the backbone or on the branched tertiary carbon of the secondary structure during the peroxide crosslinking or radiation crosslinking. Therefore, the rubber network formed by the peroxide crosslinking radiation crosslinking of the branched polyethylene has richer C—C crosslinks between the main chains than the ethylene-propylene rubber, which can effectively avoid the concentration of stress, and contribute to better mechanical properties, including tear strength. Moreover, better crosslinking ability can effectively increase the crosslinking density, and the molecular weight distribution of the branched polyethylene is close to 2, which is narrower than a common ethylene-propylene rubber, so it is expected to obtain better compression set resistance. Therefore, the technical solution of the present invention can provide a foamed product having good heat resistance, mechanical strength, and compression set resistance.

In a further technical solution, based on 100 parts by weight of the rubber matrix, the content of the branched polyethylene is A, in which $10 \leq A \leq 100$ parts, the content of EPM and EPDM is B, in which $0 \leq B \leq 90$ parts, where the branched polyethylene is an ethylene homopolymer having a degree of branching of 60-130 branches/1000 carbon atoms, a weight average molecular weight of 66,000-518,000, and a Mooney viscosity ML (1+4) at 125° C. of 9-102.

In a further technical solution, based on 100 parts by weight of the rubber matrix, the content of the branched polyethylene is A, in which $10 \leq A \leq 100$ parts, the content of EPM and EPDM is B, in which $0 \leq B \leq 90$ parts, where the branched polyethylene is an ethylene homopolymer having a degree of branching of 70-116 branches/1000 carbon atoms, a weight average molecular weight of 201,000-436,000, and a Mooney viscosity ML (1+4) at 125° C. of 9-102.

In a further technical solution, based on 100 parts by weight of the rubber matrix, the content of the branched polyethylene is A, in which $10 \leq A \leq 100$ parts, the content of EPM and EPDM is B, in which $0 \leq B \leq 90$ parts, where the branched polyethylene is an ethylene homopolymer having a degree of branching of 80-105 branches/1000 carbon atoms, a weight average molecular weight of 250,000-400,000, and a Mooney viscosity ML (1+4) at 125° C. of 40-95.

In a further technical solution, based on 100 parts by weight of the rubber matrix, the content of the branched polyethylene is A, in which $10 \leq A \leq 100$ parts, the content of EPM and EPDM is B, in which $0 \leq B \leq 90$ parts, where the branched polyethylene is an ethylene homopolymer having a degree of branching of 80-105 branches/1000 carbon atoms, a weight average molecular weight of 268,000-356,000, and a Mooney viscosity ML (1+4) at 125° C. of 42-80.

In a further technical solution, a third monomer of EPDM is preferably a diene monomer, particularly selected from the group consisting of 5-ethylidene-2-norbornene, 5-vinyl-2-norbornene, dicyclopentadiene, 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, 5-methylene-2-norbornene, 5-pentylidene-2-norbornene, 1,5-cyclooctadiene, 1,4-cyclooctadiene, and the like. In particular, the ethylene-propylene rubber may contain two or more diene monomers, for example, 5-ethylidene-2-norbornene and 5-vinyl-2-norbornene. The functional group of the diene monomer can function as an intrinsic assistant crosslinking agent in the peroxide vulcanization to improve the crosslinking efficiency. This reduces the amount and residue of the crosslinking agent and the assistant crosslinking agent required and the cost when they are added. The content in percentages by weight of the diene monomer relative to the ethylene-propylene rubber is preferably from 1% to 14%, more preferably from 3% to 10%, and further preferably from 4% to 7%.

In a further technical solution, the crosslinking agent includes at least one of a peroxide crosslinking agent and sulfur. The peroxide crosslinking agent includes at least one of di-tert-butyl peroxide, dicumyl peroxide, tert-butyl cumyl peroxide, 1,1-di-tert-butyl peroxide-3,3,5-trimethylcyclo-hexane, 2,5-dimethyl-2,5-di(tert-butylperoxy)hexane, 2,5-dimethyl-2,5-di(tert-butylperoxy)hexyne-3, bis(tert-butylp-eroxyisopropyl)benzene, 2,5-dimethyl-2,5-bis(benzoylperoxy)hexane, tert-butyl peroxybenzoate, and tert-butylperoxy-2-ethylhexyl carbonate.

In a further technical solution, based on 100 parts by weight of the rubber matrix, the crosslinking agent is preferably used in an amount of 0.5-6 parts by weight.

In a further technical solution, the foaming agent comprises at least one of sodium bicarbonate, azodicarbonamide (AC), dinitrosopentylenetetramine (H), 4,4'-oxydibenzene-sulfonyl hydrazide (OBSH), benzenesulfonyl hydrazide (BSH), urea, and a low-boiling point hydrocarbon foaming agent in the form of microcapsules.

In a further technical solution, the rubber composition comprises auxiliary components, which comprise, based on 100 parts by weight of the rubber matrix, 0.2 to 10 parts of an assistant crosslinking agent, 30 to 200 parts of a reinforcing filler, 10 to 100 parts of a plasticizer, 1 to 3 parts of a stabilizer, 2 to 20 parts of a metal oxide, 3 to 7 parts of a silane coupling agent, 1 to 5 parts of polyethylene glycol, 0.5 to 3 parts of stearic acid and 0 to 3 parts of a vulcanization accelerator.

In a further technical solution, the silane coupling agent comprises at least one of vinyl tris(2-methoxyethoxy)silane (A-172), γ-glycidoxypropyltrimethoxysilane (A-187) and γ-mercaptopropyltrimethoxysilane (A-189).

In a further technical solution, the stabilizer comprises at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB).

In a further technical solution, the assistant crosslinking agent comprises at least one of triallyl cyanurate, triallyl isocyanurate, ethylene glycol dimethacrylate, triethylene glycol dimethacrylate, triallyl trimellitate, trimethylolpro-pane trimethacrylate, N,N'-m-phenylene bismaleimide, N,N'-bis(furfurylidene) acetone, 1,2-polybutadiene, a metal salt of an unsaturated carboxylic acid, and sulfur. The metal salt of an unsaturated carboxylic acid includes at least one of zinc acrylate, zinc methacrylate, and magnesium methacry-late.

In a further technical solution, the plasticizer comprises at least one of pine tar, motor oil, naphthenic oil, paraffin oil, coumarone, RX-80, vaseline, and paraffin. Proper use of a plasticizer can increase the elasticity of the rubber com-pound and the plasticity suitable for process operation. In order to increase the adhesion, it is also preferred to use a tackifier such as pine tar, coumarone, RX-80, liquid poly-isobutene and the like.

In a further technical solution, the metal oxide includes at least one of zinc oxide, magnesia, and calcium carbonate.

In a further technical solution, the reinforcing filler comprises at least one of carbon black, silica, calcium carbonate, talc, calcined clay, magnesium silicate, and magnesium carbonate.

In a further technical solution, the vulcanization accel-erator comprises at least one of 2-mercaptobenzothiazole, dibenzothiazyl disulfide, tetramethyl thiuram monosulfide, tetramethyl thiuram disulfide, tetraethyl thiuram disulfide, N-cyclohexyl-2-benzothiazole sulfenamide, N,N-dicyclo-hexyl-2-benzothiazole sulfenamide, bismaleimide, and eth-ylene thiourea.

The crosslinking agent, the assistant crosslinking agent and the vulcanization accelerator involved in the rubber composition provided in the present invention all belong to a crosslinking system.

The rubber composition of the present invention may be present in the form of an uncrosslinked rubber mix, and may be present in the form of a vulcanized rubber after a further crosslinking reaction. The vulcanized rubber may also be simply referred to as a vulcanizate.

The present invention also provides a processing method for obtaining the rubber composition, which comprises the following steps:

(1) rubber mixing, comprising adding other components than a crosslinking system and the foaming agent in the rubber composition sequentially to an internal mixer accord-ing to the parts by weight and mixing; and then adding the crosslinking system and the foaming agent, mixing uni-formly, and discharging to obtain a rubber mix; and plasti-cating the rubber mix on an open mill, unloading the sheet, and standing for vulcanization later, where the crosslinking system includes a crosslinking agent, and also at least one of an assistant crosslinking agent and a vulcanization accelera-tor; and (2) vulcanization, comprising filling the rubber mix into a cavity of a mold, vulcanizing on a press vulcanizer, and releasing from the mold to obtain a vulcanized rubber. In order to improve the compression set resistance of the vulcanized rubber, a post vulcanization process can be further used for vulcanization.

The present invention also provides a sponge seal strip, where the rubber compound used comprises the above rubber composition.

The present invention further provides a method for producing a sponge seal strip, which comprises the follow-ing steps:

(1) rubber mixing, comprising adding other components than a crosslinking system and the foaming agent in the rubber composition sequentially to an internal mixer accord-ing to the parts by weight and mixing; and then adding the crosslinking system and the foaming agent, mixing uni-formly, and discharging to obtain a rubber mix; and plasti-cating the rubber mix on an open mill, unloading the sheet, and standing for vulcanization later, where the crosslinking system includes a crosslinking agent, and also at least one of an assistant crosslinking agent and a vulcanization accelera-tor;

(2) mixing in an open mill, discharging the sheet, cooling, and standing; and (3) extruding in an extruder, vulcanizing in a salt bath, molding, cooling, punching, and cutting.

The present invention also provides a foamed material of high expansion ratio, where the rubber compound used comprises the above rubber composition.

The present invention further provides a method for producing a foamed material of high expansion ratio, which comprises the following steps:

(1) rubber mixing, comprising adding other components than the crosslinking system and the foaming agent in the rubber composition sequentially to an internal mixer accord-ing to the parts by weight and mixing; then adding the crosslinking system and the foaming agent, mixing uni-formly, and discharging to obtain a rubber mix; and plasti-cating the rubber mix on an open mill, unloading the sheet, and standing for vulcanization later, and then plasticating the rubber mix on an open mill, and unloading the sheet, where the crosslinking system includes a crosslinking agent, and also at least one of an assistant crosslinking agent and a vulcanization accelerator;

(2) placing the rubber mix in a mold at 60-80° C., pressing on a press vulcanizer, and premolding;

(3) placing the premolded rubber sheet in a mold, and foaming for a period of time at a high temperature; and (4) cooling the rubber, and removing from the mold, to obtain a foamed material.

The present invention also provides a shock-absorbing foamed rubber sheet, where the rubber compound used comprises the above rubber composition.

The present invention further provides a method for producing a shock absorbing foamed rubber sheet, which comprises the following steps:

(1) rubber mixing, comprising adding other components than the crosslinking system and the foaming agent in the rubber composition sequentially to an internal mixer according to the parts by weight and mixing; then adding the crosslinking system and the foaming agent, mixing uniformly, and discharging to obtain a rubber mix; and plasticating the rubber mix on an open mill, unloading the sheet, and standing for vulcanization later, wherein the crosslinking system comprises a crosslinking agent, and also at least one of an assistant crosslinking agent and a vulcanization accelerator;

(2) cooling the discharged rubber compound, plasticating on an open mill with a roll gap of less than 1 mm, unloading the sheet, and standing;

(3) feeding the stood rubber sheet to an open mill, hot milling, and then discharging the sheet;

(4) forming by cutting the stood hot-milled rubber sheet according to the size of a cavity of a mold;

(5) filling the cut rubber sheet into the cavity of the mold, and mold vulcanizing; and (6) thermally releasing from the mold, and trimming, to obtain a foamed rubber sheet product.

The shock-absorbing foamed rubber product can be used as a sole by a sewing process or by applying a binder. The binder used herein may be a binder commonly used in the prior art for ethylene-propylene rubbers, preferably an environmentally-friendly binder. The shock-absorbing foamed rubber product may also be directly used as an insole, where the crosslinking agent is preferably one that is less odorous after vulcanization, such as bis(tert-butylperoxyisopropyl) benzene.

The present invention also provides a processing method for obtaining a foamed rubber material, which comprises the following steps:

(1) rubber mixing, comprising adding other components than the crosslinking system and the foaming agent in the rubber composition sequentially to an internal mixer according to the parts by weight and mixing; then discharging, standing, adding the crosslinking system and the foaming agent on an open mill, and mixing; and standing, remilling on an open mill or an extruder, molding the discharged sheet, and standing for use, where the crosslinking system comprises a crosslinking agent, a radiation sensitizing assistant crosslinking agent and also a vulcanization accelerator;

(2) radiation pre-vulcanization, comprising: irradiating the molded rubber mix at normal temperature under normal pressure to make the rubber sheet have a certain degree of pre-crosslinking; and (3) high-temperature foaming vulcanization, comprising: placing the sheet after radiation pre-vulcanization in a mold, vulcanizing and foaming molding at high temperature under high pressure, then releasing from the mold and cooling to obtain a foamed rubber material.

In a further technical solution, the beam energy from the electron accelerator used in the radiation pre-vulcanization is 2-10 MeV, and the emitted ray particles can absolutely penetrate the raw rubber sheet. The scan width of electron beam is 0.2-1.6 m, the radiation absorption dose of the raw rubber sheet is 5-60 KGy, the radiation atmosphere is an oxygen-limited environment with an inert gas, and the time required for radiation pre-vulcanization is not more than 5 minutes per sheet. The conditions for foaming vulcanization include 160-180° C., 6-15 MPa, and 10-20 min.

The present invention also provides a light-colored high-strength foamed sheet, where the rubber compound used comprises the above rubber composition.

The present invention further provides a method for producing a light-colored high-strength foamed sheet, which comprises the following steps:

(1) rubber mixing, comprising adding other components than a crosslinking system and the foaming agent in the rubber composition sequentially to an internal mixer according to the parts by weight and mixing; and then adding the crosslinking system and the foaming agent, mixing uniformly, and discharging to obtain a rubber mix; and plasticating the rubber mix on an open mill, unloading the sheet, and standing for vulcanization later, where the crosslinking system includes a crosslinking agent, a radiation sensitizing assistant crosslinking agent and also a vulcanization accelerator;

(2) forming by cutting the stood thin sheet according to the size of a cavity of a mold;

(3) radiation pre-vulcanization, comprising: irradiating the formed rubber mix at normal temperature under normal pressure to make the rubber sheet have a certain degree of pre-crosslinking; and (4) high-temperature foaming vulcanization, comprising: placing the sheet after radiation pre-vulcanization in a mold, vulcanizing and foaming molding at high temperature under high pressure, then releasing from the mold, cooling and trimming to obtain a light-colored high-strength foamed sheet.

The present invention also provides a foam-solid composite seal strip, where the rubber compound used in the foamed portion comprises the above rubber composition, and preferably the above rubber composition comprising a reinforcing filler.

The present invention also provides a method for producing a foam-solid composite seal strip, comprising the steps of:

(1) mixing, comprising: obtaining a rubber mix for a solid portion and a formed portion respectively by mixing in an internal mixer, plasticating on an open mill, unloading the sheets, cooling, and standing;

(2) multiple extrusion and vulcanization, comprising: co-extruding and molding the rubber mix for the solid portion and the vulcanized rubber for the foamed portion by a multiple extruder, and then vulcanizing by a salt bath vulcanization process; and (3) after the vulcanization, cooling, trimming, and cutting to obtain a finished product.

The present invention also provides a solid cycle tire filled with an inner layer of a foamed elastomer, where the rubber compound used in the internally filled foamed elastomer comprises the above rubber composition, and preferably the above rubber composition comprising a reinforcing filler.

The solid cycle tire may be a bicycle tire, a trolley tire, an animal vehicle tire, and an electric vehicle tire, which has the anti-puncturing effect.

The present invention also provides a method for producing a solid cycle tire with an inner layer of a foamed elastomer, which comprises the following steps: mixing the inner-layer rubber in an internal mixer, discharging, plasticating, unloading the sheet, steeping with a spacer fluid, cooling, and standing; then extruding the rubber mix through an extruder to obtain a rubber strip with suitable cross-section size, and then cutting and splicing, to obtain a semi-finished product of foaming rubber strip; and mounting the semi-finished product of foaming rubber strip onto a mold, sleeving a finished outer tire, evenly piercing the top of the outer tire with a steel needle, vulcanizing and foaming in a vulcanization oven, to obtain a finished product after vulcanization.

In the heating vulcanization process for the rubber composition provided in the present invention, a heating tank having heating means such as hot air, glass bead fluidized bed, ultra-high frequency electromagnetic wave (UHF), steam, and hot molten salt bath (LCM) and a metal mold may be used. The heating temperature is preferably from 150 to 170° C.; and the heating time is preferably from 1 to 30 minutes.

In the electron beam radiation vulcanization process for the rubber composition provided in the present invention, the energy of the electron beam is preferably 0.1 to 10 MeV, and more preferably 0.3 to 5 MeV, and radiation is performed so that the absorbed dose is preferably 5 to 350 kGy, and more preferably 5 to 100 kGy.

Compared with the prior art, the present invention has the following beneficial effects. Branched polyethylene is used to replace a part or all of the ethylene-propylene rubber in the foaming rubber composition, and a peroxide vulcanization system or a combined system of a peroxide and sulfur is adopted. Since branched polyethylene has more branches on its molecular structure, and the branches has a certain length distribution and may have a number of secondary branch structures. The crosslinking point of the branched polyethylene could be generated on the tertiary carbon of the backbone or on the branched tertiary carbon of the secondary structure during the peroxide crosslinking or radiation crosslinking process. Therefore, the rubber network formed by the peroxide crosslinking or radiation crosslinking of the branched polyethylene could have richer C—C crosslinks between the main chains than the ethylene-propylene rubber, which are similar to the polysulfide linkages in the sulfur vulcanization system, but have a much higher bond energy, and by which the concentration of stress can be effectively avoided, and better overall mechanical properties are expected to be achieved while a good cross-linking efficiency is effected. Moreover, branched polyethylene has more long branches and higher melt strength, which is more conducive to foaming, especially pre-forming. Due to the narrow molecular weight distribution of branched polyethylene of generally lower than 2.5, the rubber composition of the present invention has a lower compression set after vulcanization. Furthermore, due to the presence of branched polyethylene, a peroxide-based crosslinking system is required, and the peroxide crosslinking system cannot achieve pre-crosslinking at a low temperature. In the radiation pretreatment process in the present invention, the crosslinking of some rubber polymers can be quickly achieved without heating. Therefore, the foaming agent does not decompose, and the degree of pre-vulcanization of the rubber can be accurately controlled by controlling the radiation dose. The rubber sheet treated with a certain radiation dose has a pre-crosslinking strength before the foaming agent is thermally decomposed, and the modulus of the rubber compound is increased, such that the pressure of gas generated when the foaming agent is decomposed can be resisted without cracking. As a result, closed cell structures are formed, from which gas is unlikely to escape. In this way, the vulcanization speed and the foaming speed is matched to prepare a foamed rubber product with good performance. By adding a radiation crosslinking sensitizer, the radiation dose can be greatly reduced, the radiation processing energy of the rubber sheet is saved, the time is saved, and the productivity is greatly improved, while the Green strength of the rubber compound is increased to allow the rubber compound to have a certain degree of pre-crosslinking. The radiation crosslinking sensitizer can also serve as an assistant crosslinking agent for the peroxide crosslinking agent to improve the crosslinking efficiency and crosslinking depth of the peroxide vulcanization.

DETAILED DESCRIPTION

The following examples are given to further illustrate the present invention, and not intended to limit the scope of the present invention. Some non-essential improvements and modifications made by the skilled person in the art based on the disclosure herein are still within the scope of the present invention.

To more clearly illustrate the embodiments of the present invention, the materials involved in the present invention are defined below.

The crosslinking system includes a crosslinking agent, and also at least one of an assistant crosslinking agent and a vulcanization accelerator.

The present invention relates to a rubber composition, which comprises a rubber matrix and essential components. The rubber matrix comprises a branched polyethylene with a content represented as A, in which $0<a\leq100$ parts, where the branched polyethylene has a degree of branching of 60-130 branches/1000 carbon atoms, a weight average molecular weight of 66,000-518,000, and a Mooney viscosity ML(1+4) at 125° C. of 6-102; and an EPM and an EPDM with a total content represented as B, in which $0\leq B<100$ parts, where the Mooney viscosity ML(1+4) at 125° C. is preferably 50-90, and the ethylene content is preferably 40%-70%. Based on 100 parts by weight of the rubber matrix, the essential components comprise 0.5-10 parts of a crosslinking agent, and 1.5-25 parts of a foaming agent.

The rubber composition further comprises auxiliary components, which comprise 0.2 to 10 parts of an assistant crosslinking agent, 30 to 200 parts of a reinforcing filler, 10 to 100 parts of a plasticizer, 1 to 3 parts of a stabilizer, 2 to 20 parts of a metal oxide, 3 to 7 parts of a silane coupling agent, 1 to 5 parts of polyethylene glycol, 0.5 to 3 parts of stearic acid and 0 to 3 parts of a vulcanization accelerator.

The silane coupling agent comprises at least one of vinyl tris(2-methoxyethoxy)silane (A-172), γ-glycidoxypropyltrimethoxysilane (A-187) and γ-mercaptopropyltrimethoxysilane (A-189).

The stabilizer comprises at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB);

The assistant crosslinking agent comprises at least one of triallyl cyanurate, triallyl isocyanurate, ethylene glycol dimethacrylate, ethyl dimethacrylate, triethylene glycol dimethacrylate, triallyl trimellitate, trimethylolpropane trimethacrylate, ethylene glycol dimethacrylate, N,N'-m-phenylene bismaleimide, N,N'-bis(furfurylidene) acetone, 1,2-polybutadiene, zinc acrylate, zinc methacrylate, magnesium methacrylate, calcium methacrylate, aluminum methacrylate and sulfur.

The plasticizer comprises at least one of pine tar, motor oil, naphthenic oil, paraffin oil, coumarone, RX-80, vaseline, and paraffin.

The metal oxide comprises at least one of zinc oxide, magnesia, and calcium oxide. The reinforcing filler comprises at least one of carbon black, silica, calcium carbonate, talc, calcined clay, magnesium silicate, and magnesium carbonate.

with are disclosed in the prior art, as described in, without limitation, CN102827312A, CN101812145A, CN101531725A, CN104926962A, U.S. Pat. Nos. 6,103, 658, and 6,660,677.

The branched polyethylene used is characterized by having a degree of branching of 60-130 branches/1000 carbon atoms, a weight average molecular weight of 66,000-518, 000, and a Mooney viscosity ML (1+4) at 125° C. of 9-102. The degree of branching is measured by $^1$H NMR, and the molar percentages of various branches are measured by $^{13}$C NMR.

The details are shown in a table below:

| Branched polyethylene No. | Degree of branching | Methyl content/% | Ethyl content/% | Propyl content/% | Butyl content/% | Pentyl content/% | Content of hexyl and higher branches/% | Weight average molecular weight/ 10,000 | Molecular weight distribution | Mooney viscosity ML (1 + 4) 125° C. |
|---|---|---|---|---|---|---|---|---|---|---|
| PER-1 | 130 | 46.8 | 18.3 | 8.3 | 6.7 | 5.2 | 14.7 | 6.6 | 2.2 | 9 |
| PER-2 | 116 | 51.2 | 17.6 | 8.2 | 5.8 | 5.1 | 12.1 | 20.1 | 2.1 | 23 |
| PER-3 | 105 | 54.0 | 13.7 | 6.4 | 5.3 | 5.1 | 15.5 | 26.8 | 2.1 | 42 |
| PER-4 | 102 | 56.2 | 12.9 | 6.2 | 5.2 | 4.9 | 14.6 | 27.9 | 2.1 | 52 |
| PER-5 | 99 | 59.6 | 11.6 | 5.8 | 4.9 | 5.1 | 13.0 | 28.3 | 1.8 | 63 |
| PER-6 | 90 | 62.1 | 9.4 | 5.4 | 4.6 | 4.5 | 14.0 | 32.1 | 2.1 | 77 |
| PER-7 | 82 | 64.2 | 8.7 | 5.3 | 4.2 | 3.9 | 13.7 | 35.6 | 1.7 | 80 |
| PER-8 | 70 | 66.5 | 7.2 | 4.6 | 3.2 | 3.2 | 15.3 | 43.6 | 2.1 | 93 |
| PER-9 | 60 | 68.1 | 7.1 | 4.2 | 2.7 | 2.8 | 15.1 | 51.8 | 2.2 | 102 |
| PER-10 | 87 | 61.8 | 10.3 | 5.4 | 4.6 | 4.9 | 12.0 | 40.1 | 1.8 | 101 |
| PER-11 | 94 | 60.5 | 10.8 | 5.7 | 4.7 | 4.9 | 13.3 | 37.8 | 2.0 | 85 |
| PER-12 | 102 | 56.8 | 12.7 | 6.1 | 5.2 | 5.1 | 13.9 | 34.8 | 1.9 | 66 |

The vulcanization accelerator comprises at least one of 2-mercaptobenzothiazole, dibenzothiazyl disulfide, tetramethyl thiuram monosulfide, tetramethyl thiuram disulfide, tetraethyl thiuram disulfide, N-cyclohexyl-2-benzothiazole sulfenamide, N,N-dicyclohexyl-2-benzothiazole sulfenamide, bismaleimide, and ethylene thiourea.

The crosslinking agent includes at least one of a peroxide crosslinking agent and sulfur. The peroxide crosslinking agent includes at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate.

The foaming agent comprises at least one of sodium bicarbonate, azodicarbonamide (AC), dinitrosopentylenetetramine (H), 4,4'-oxydibenzenesulfonyl hydrazide (OBSH), benzenesulfonyl hydrazide (BSH), urea, and a low-boiling point hydrocarbon foaming agent in the form of microcapsules.

The EPM used preferably has a Mooney viscosity ML (1+4) at 125° C. of 30-50 and preferably has an ethylene content of 45%-60%. The EPDM used preferably has a Mooney viscosity ML (1+4) at 125° C. of 20 to 100 and further preferably 30 to 80, and preferably has an ethylene content of 55% to 75%. The third monomer is 5-ethylidene-2-norbornene, 5-vinyl-2-norbornene or dicyclopentadiene, and the content of the third monomer is 1%-7%.

The branched polyethylene can be obtained by the catalytic homopolymerization of ethylene in the presence of an (α-diimine) nickel catalyst and a cocatalyst. The structure of the (α-diimine) nickel catalyst used, the synthesis method and the method for preparing branched polyethylene there- Test Methods of Rubber Performances 1. Density: The test is carried out in accordance with the national standard GB/T533-1991.

2. Tensile strength and elongation at break performance test: The test is carried out using an electronic tensile tester at a tensile speed of 500 mm/min and a test temperature of 23+2° C. in accordance with the national standard GB/T10654-2001.

3. Mooney viscosity test: The test is carried out in accordance with the national standard GB/T1232.1-2000, with a Mooney viscosity meter at a test temperature of 125° C. by preheating for 1 minute, and the test is continued for 4 minutes.

4. Vulcanization-foaming curve test: The test is carried out in accordance with the national standard GB/T16584.

5. Compression set resistance test: The test is carried out with a Type B specimen using a compression set tester in accordance with the national standard GB/T7759-1996, where the compression rate is 25%, the test temperature is 120° C., and the compression time is 70 h.

Specific examples are shown below.

Example 1

Branched polyethylene No. PER-9 was used.

The processing steps of the rubber composition were as follows.

(1) Rubber mixing: The temperature of the internal mixer was set to 90° C., and the rotor speed was set to 50 rpm. 90 parts of EPDM and 10 parts of branched polyethylene were added, prepressed and mixed for 90 seconds. 10 parts of zinc oxide, and 2 parts of stearic acid were added and mixed for 1 min. Then 5 parts of calcium oxide and 2 parts of polyethylene glycol PEG4000 were added and mixed for 1 min. Next, 50 parts of carbon black N550, 20 parts of carbon black N765, 50 parts of calcium carbonate and 70 parts of paraffin oil SUNPAR2280 were added in two equal batches to the rubber compound, and mixed for 4 min. Finally, 3 parts of the crosslinking agent dicumyl peroxide (DCP), 1 part of the assistant crosslinking agent triallyl isocyanurate (TAIC), 20 parts of the foaming agent azodicarbonamide (AC) and 2 parts of the foaming agent urea were added, mixed for 3 min, and then discharged. The rubber mix was plasticated on an open mill with a roll temperature of 80° C. and then the roll gap was increased to obtain a sheet having a thickness of about 2.2 to 2.5 mm, which was unloaded, and stood for 20 hours.

(2) After vulcanization, various tests were carried out after standing for 16 hrs.

Example 2

Branched polyethylene No. PER-2 was used.

The processing steps of the rubber composition were as follows.

(1) Rubber mixing: The temperature of the internal mixer was set to 90° C., and the rotor speed was set to 50 rpm. 20 parts of EPM, 50 parts of EPDM and 30 parts of branched polyethylene were added, prepressed and mixed for 90 seconds. 10 parts of zinc oxide, and 2 parts of stearic acid were added and mixed for 1 min. Then 5 parts of calcium oxide and 2 parts of polyethylene glycol PEG4000 were added and mixed for 1 min. Next, 75 parts of carbon black N550, 50 parts of carbon black N765, 75 parts of calcium carbonate and 90 parts of paraffin oil SUNPAR2280 were added in two equal batches to the rubber compound, and mixed for 4 min. Finally, 6 parts of the crosslinking agent dicumyl peroxide (DCP), 2 parts of the assistant crosslinking agent triallyl isocyanurate (TAIC), 8 parts of the assistant crosslinking agent liquid 1,2-polybutadiene, 20 parts of the foaming agent azodicarbonamide (AC) and 2 parts of the foaming agent urea were added, mixed for 3 min, and then discharged. The rubber mix was plasticated on an open mill with a roll temperature of 80° C. and then the roll gap was increased to obtain a sheet having a thickness of about 2.2 to 2.5 mm, which was unloaded, and stood for 20 hours.

(2) After vulcanization, various tests were carried out after standing for 16 hrs.

Example 3

Branched polyethylene No. PER-5 was used.

The processing steps of the rubber composition were as follows.

(1) Rubber mixing: The temperature of the internal mixer was set to 90° C., and the rotor speed was set to 50 rpm. 50 parts of EPDM and 50 parts of branched polyethylene were added, prepressed and mixed for 90 seconds. 10 parts of zinc oxide, and 2 parts of stearic acid were added and mixed for 1 min. Then 5 parts of calcium oxide and 2 parts of polyethylene glycol PEG4000 were added and mixed for 1 min. Next, 75 parts of carbon black N550, 50 parts of carbon black N765, 75 parts of calcium carbonate and 70 parts of paraffin oil SUNPAR2280 were added in two equal batches to the rubber compound, and mixed for 4 min. Finally, 3 parts of the crosslinking agent dicumyl peroxide (DCP), 1 part of the assistant crosslinking agent triallyl isocyanurate (TAIC), 22 parts of the foaming agent azodicarbonamide (AC) and 3 parts of the foaming agent urea were added, mixed for 3 min, and then discharged. The rubber mix was plasticated on an open mill with a roll temperature of 80° C.

and then the roll gap was increased to obtain a sheet having a thickness of about 2.2 to 2.5 mm, which was unloaded, and stood for 20 hours.

(2) After vulcanization, various tests were carried out after standing for 16 hrs.

Example 4

Branched polyethylene No. PER-5 was used.

The processing steps of the rubber composition were as follows.

(1) Rubber mixing: The temperature of the internal mixer was set to 90° C., and the rotor speed was set to 50 rpm. 100 parts of branched polyethylene was added, prepressed and mixed for 90 seconds. 10 parts of zinc oxide, and 2 parts of stearic acid were added and mixed for 1 min. Then 5 parts of calcium oxide and 2 parts of polyethylene glycol PEG4000 were added and mixed for 1 min. Next, 75 parts of carbon black N550, 50 parts of carbon black N765, 75 parts of calcium carbonate and 70 parts of paraffin oil SUNPAR2280 were added in two equal batches to the rubber compound, and mixed for 4 min. Finally, 3 parts of the crosslinking agent dicumyl peroxide (DCP), 1 part of the assistant crosslinking agent triallyl isocyanurate (TAIC), 20 parts of the foaming agent azodicarbonamide (AC) and 2 parts of the foaming agent urea were added, mixed for 3 min, and then discharged. The rubber mix was plasticated on an open mill with a roll temperature of 80° C. and then the roll gap was increased to obtain a sheet having a thickness of about 2.2 to 2.5 mm, which was unloaded, and stood for 20 hours.

(2) After vulcanization, various tests were carried out after standing for 16 hrs.

Example 5

Branched polyethylene No. PER-5 was used.

The processing steps of the rubber composition were as follows.

(1) Rubber mixing: The temperature of the internal mixer was set to 90° C., and the rotor speed was set to 50 rpm. 50 parts of EPDM and 50 parts of branched polyethylene were added, prepressed and mixed for 90 seconds. 10 parts of zinc oxide, and 1 part of stearic acid were added and mixed for 1 min. Then 5 parts of calcium oxide and 2 parts of polyethylene glycol PEG4000 were added and mixed for 1 min. Next, 60 parts of carbon black N550, 60 parts of carbon black N765, and 70 parts of paraffin oil SUNPAR2280 were added in two equal batches to the rubber compound, and mixed for 4 min. Finally, 4 parts of the crosslinking agent dicumyl peroxide (DCP), 1 part of the assistant crosslinking agent triallyl isocyanurate (TAIC), 0.3 part of the assistant crosslinking agent sulfur, 2 parts of the foaming agent azodicarbonamide (AC) and 2 parts of the foaming agent 4,4'-oxydibenzenesulfonyl hydrazide (OBSH) were added, mixed for 3 min, and then discharged. The rubber mix was plasticated on an open mill with a roll temperature of 80° C. and then the roll gap was increased to obtain a sheet having a thickness of about 2.2 to 2.5 mm, which was unloaded, and stood for 20 hours.

(2) After vulcanization, various tests were carried out after standing for 16 hrs.

Example 6

Branched polyethylene No. PER-5 was used.

The processing steps of the rubber composition were as follows.

(1) Rubber mixing: The temperature of the internal mixer was set to 90° C., and the rotor speed was set to 50 rpm. 100 parts of branched polyethylene was added, prepressed and mixed for 90 seconds. 10 parts of zinc oxide, and 1 part of stearic acid were added and mixed for 1 min. Then 5 parts of calcium oxide and 2 parts of polyethylene glycol PEG4000 were added and mixed for 1 min. Next, 60 parts of carbon black N550, 60 parts of carbon black N765, and 70 parts of paraffin oil SUNPAR2280 were added in two equal batches to the rubber compound, and mixed for 4 min. Finally, 4 parts of the crosslinking agent dicumyl peroxide (DCP), 1 part of the assistant crosslinking agent triallyl isocyanurate (TAIC), 0.3 part of the assistant crosslinking agent sulfur, 2 parts of the foaming agent azodicarbonamide (AC) and 2 parts of the foaming agent 4,4'-oxydibenzene-sulfonyl hydrazide (OBSH) were added, mixed for 3 min, and then discharged. The rubber mix was plasticated on an open mill with a roll temperature of 80° C. and then the roll gap was increased to obtain a sheet having a thickness of about 2.2 to 2.5 mm, which was unloaded, and stood for 20 hours.

(2) After vulcanization, various tests were carried out after standing for 16 hrs.

Comparative Example 2

The processing steps were as follows.

(1) Rubber mixing: The temperature of the internal mixer was set to 90° C., and the rotor speed was set to 50 rpm. 100 parts of EPDM was added, prepressed and mixed for 90 seconds. 10 parts of zinc oxide, and 1 part of stearic acid were added and mixed for 1 min. Then 5 parts of calcium oxide and 2 parts of polyethylene glycol PEG4000 were added and mixed for 1 min. Next, 60 parts of carbon black N550, 60 parts of carbon black N765, and 70 parts of paraffin oil SUNPAR2280 were added in two equal batches to the rubber compound, and mixed for 4 min. Finally, 4 parts of the crosslinking agent dicumyl peroxide (DCP), 1 part of the assistant crosslinking agent triallyl isocyanurate (TAIC), 0.3 part of the assistant crosslinking agent sulfur, 2 parts of the foaming agent azodicarbonamide (AC) and 2 parts of the foaming agent 4,4'-oxydibenzenesulfonyl hydrazide (OBSH) were added, mixed for 3 min, and then discharged. The rubber mix was plasticated on an open mill with a roll temperature of 80° C. and then the roll gap was increased to obtain a sheet having a thickness of about 2.2 to 2.5 mm, which was unloaded, and stood for 20 hours.

(2) After vulcanization, various tests were carried out after standing for 16 hrs.

The performance test data is shown in a table below.

| Test Item | Example 1 | Example 2 | Example 3 | Example 4 | Example 5 | Example 6 | Comparative Example 1 | Comparative Example 2 |
|---|---|---|---|---|---|---|---|---|
| Density/(g · cm$^3$) | 0.25 | 0.21 | 0.2 | 0.19 | 0.53 | 0.54 | 0.22 | 0.51 |
| Tensile strength/MPa | 1.2 | 1.3 | 1.2 | 1.5 | 2.3 | 2.7 | 0.8 | 1.8 |
| Elongation at break/% | 252 | 276 | 332 | 327 | 317 | 322 | 278 | 289 |
| Compression set (at 70° C. for 70 h) | 20 | 19 | 19 | 17 | 22 | 19 | 22 | 26 |

(2) After vulcanization, various tests were carried out after standing for 16 hrs.

Comparative Example 1

The processing steps were as follows.

(1) Rubber mixing: The temperature of the internal mixer was set to 90° C., and the rotor speed was set to 50 rpm. 100 parts of EPDM was added, prepressed and mixed for 90 seconds. 10 parts of zinc oxide, and 2 parts of stearic acid were added and mixed for 1 min. Then 5 parts of calcium oxide and 2 parts of polyethylene glycol PEG4000 were added and mixed for 1 min. Next, 75 parts of carbon black N550, 50 parts of carbon black N765, 75 parts of calcium carbonate and 70 parts of paraffin oil SUNPAR2280 were added in two equal batches to the rubber compound, and mixed for 4 min. Finally, 3 parts of the crosslinking agent dicumyl peroxide (DCP), 1 part of the assistant crosslinking agent triallyl isocyanurate (TAIC), 20 parts of the foaming agent azodicarbonamide (AC) and 2 parts of the foaming agent urea were added, mixed for 3 min, and then discharged. The rubber mix was plasticated on an open mill with a roll temperature of 80° C. and then the roll gap was increased to obtain a sheet having a thickness of about 2.2 to 2.5 mm, which was unloaded, and stood for 20 hours.

Data analysis: By comparing Examples 1 to 4 and Comparative Example 1 or by comparing Examples 5 and 6 and Comparative Example 2, it can be found that with increasing amount of branched polyethylene in place of ethylene-propylene rubber, the tensile strength of the foamed rubber obtained by vulcanization is increased, the compression set is lowered, and the overall performance is improved.

Example 7

Branched polyethylene No. PER-8 was used.

The processing steps of the rubber composition were as follows.

(1) Rubber mixing: The temperature of the internal mixer was set to 90° C., and the rotor speed was set to 50 rpm. 20 parts of EPM, 60 parts of EPDM and 20 parts of branched polyethylene were added, prepressed and mixed for 90 seconds. Then 0.5 part of the crosslinking agent dicumyl peroxide (DCP), and 6 parts of the foaming agent azodicarbonamide (AC) were added, mixed for 3 min, and then discharged. The rubber mix was plasticated on an open mill with a roll temperature of 80° C., and then the roll gap was increased to obtain a sheet having a thickness of about 2.2-2.5 mm, which was unloaded and stood for 20 hours.

(2) After vulcanization, various tests were carried out after standing for 16 hrs.

Example 8

Branched polyethylene No. PER-7 was used.

The processing steps of the rubber composition were as follows.

(1) Rubber mixing: The temperature of the internal mixer was set to 90° C., and the rotor speed was set to 50 rpm. 50 parts of EPDM and 50 parts of branched polyethylene were added, prepressed and mixed for 90 seconds. Then 0.5 part of the crosslinking agent dicumyl peroxide (DCP), and 6 parts of the foaming agent azodicarbonamide (AC) were added, mixed for 3 min, and then discharged. The rubber mix was plasticated on an open mill with a roll temperature of 80° C., and then the roll gap was increased to obtain a sheet having a thickness of about 2.2-2.5 mm, which was unloaded and stood for 20 hours.

(2) After vulcanization, various tests were carried out after standing for 16 hrs.

Example 9

Branched polyethylene Nos. PER-1 and PER-7 were used.

The processing steps of the rubber composition were as follows.

(1) Rubber mixing: The temperature of the internal mixer was set to 90° C., and the rotor speed was set to 50 rpm. 20 parts of PER-1 and 80 parts of PER-7 were added, prepressed and mixed for 90 seconds. Then 0.5 part of the crosslinking agent dicumyl peroxide (DCP), and 6 parts of the foaming agent azodicarbonamide (AC) were added, mixed for 3 min, and then discharged. The rubber mix was plasticated on an open mill with a roll temperature of 80° C., and then the roll gap was increased to obtain a sheet having a thickness of about 2.2-2.5 mm, which was unloaded and stood for 20 hours.

(2) After vulcanization, various tests were carried out after standing for 16 hrs.

Example 10

Branched polyethylene No. PER-3 was used.

The processing steps of the rubber composition were as follows.

(1) Rubber mixing: The temperature of the internal mixer was set to 90° C., and the rotor speed was set to 50 rpm. 100 parts of branched polyethylene was added, prepressed and mixed for 90 seconds. Then 30 parts of carbon black N550 was added and mixed for 2 min. 0.5 part of the crosslinking agent dicumyl peroxide (DCP), and 6 parts of the foaming agent azodicarbonamide (AC) were added, mixed for 3 min, and then discharged.

The rubber mix was plasticated on an open mill with a roll temperature of 80° C., and then the roll gap was increased to obtain a sheet having a thickness of about 2.2-2.5 mm, which was unloaded and stood for 20 hours.

(2) After vulcanization, various tests were carried out after standing for 16 hrs.

Example 11

Branched polyethylene No. PER-6 was used.

The processing steps of the rubber composition were as follows.

(1) Rubber mixing: The temperature of the internal mixer was set to 90° C., and the rotor speed was set to 50 rpm. 50 parts of EPDM and 50 parts of branched polyethylene were added, prepressed and mixed for 90 seconds. 5 parts of zinc oxide, 2 parts of stearic acid and 2 parts of the anti-aging agent RD were added and mixed for 2 min. Then 50 parts of carbon black N550, 20 parts of carbon black N330, and 55 parts of paraffin oil SUNPAR2280 were added, and mixed for 4 min. Finally, 2 parts of the crosslinking agent dicumyl peroxide (DCP), 0.3 part of the assistant crosslinking agent sulfur, 0.5 part of N-cyclohexyl-2-benzothiazole sulfenamide, 0.3 part of tetramethyl thiuram disulfide, 0.5 parts of the foaming agent azodicarbonamide (AC) and 1 part of the foaming agent 4,4'-oxydibenzenesulfonyl hydrazide (OBSH) were added, mixed for 3 min, and then discharged. The rubber mix was plasticated on an open mill with a roll temperature of 80° C. and then the roll gap was increased to obtain a sheet having a thickness of about 2.2 to 2.5 mm, which was unloaded, and stood for 20 hours.

(2) After vulcanization, various tests were carried out after standing for 16 hrs.

Example 12

Branched polyethylene No. PER-6 was used.

The processing steps of the rubber composition were as follows.

(1) Rubber mixing: The temperature of the internal mixer was set to 90° C., and the rotor speed was set to 50 rpm. 100 parts of branched polyethylene was added, prepressed and mixed for 90 seconds. 5 parts of zinc oxide, 2 parts of stearic acid and 2 parts of the anti-aging agent RD were added and mixed for 2 min. Then 50 parts of carbon black N550, 20 parts of carbon black N330, and 55 parts of paraffin oil SUNPAR2280 were added, and mixed for 4 min. Finally, 2 parts of the crosslinking agent dicumyl peroxide (DCP), 0.3 part of the assistant crosslinking agent sulfur, 0.5 part of N-cyclohexyl-2-benzothiazole sulfenamide, 0.3 part of tetramethyl thiuram disulfide, and 2 parts of the foaming agent 4,4'-oxydibenzenesulfonyl hydrazide (OBSH) were added, mixed for 3 min, and then discharged. The rubber mix was plasticated on an open mill with a roll temperature of 80° C. and then the roll gap was increased to obtain a sheet having a thickness of about 2.2 to 2.5 mm, which was unloaded, and stood for 20 hours.

(2) After vulcanization, various tests were carried out after standing for 16 hrs.

Example 13

Branched polyethylene No. PER-4 was used.

The processing steps of the rubber composition were as follows.

(1) Rubber mixing: The temperature of the internal mixer was set to 70° C., and the rotor speed was set to 50 rpm. 50 parts of EPDM and 50 parts of branched polyethylene were added, pre-pressed and mixed for 90 seconds. Then 10 parts of 30# motor oil and 4 parts of vinyl tris(2-methoxyethoxy) silane (A-172) were added, and mixed for 1 min. Next, 50 parts of silica N255 produced by precipitation, 3 parts of polyethylene glycol, and 10 parts of zinc oxide were added sequentially and mixed for 2 min. Finally, 2 parts of the crosslinking agent dicumyl peroxide (DCP) and 6 parts of the foaming agent azodicarbonamide (AC) were added, mixed for 3 min, and then discharged. The rubber mix was plasticated 10 times on an open mill with a roll gap of 0.4 mm, and then the roll gap was increased to obtain a sheet having a thickness of about 2.2 to 2.5 mm, which was unloaded, and stood for 20 hours.

(2) After vulcanization, various tests were carried out after standing for 16 hrs.

Example 14

Branched polyethylene No. PER-4 was used.

The processing steps of the rubber composition were as follows.

(1) Rubber mixing: The temperature of the internal mixer was set to 70° C., and the rotor speed was set to 50 rpm. 100 parts of branched polyethylene was added, pre-pressed and mixed for 90 seconds. Then 10 parts of 30# motor oil and 4 parts of vinyl tris(2-methoxyethoxy)silane (A-172) were added, and mixed for 1 min. Next, 50 parts of silica N255 produced by precipitation, 3 parts of polyethylene glycol, and 10 parts of zinc oxide were added sequentially and mixed for 2 min. Finally, 2 parts of the crosslinking agent dicumyl peroxide (DCP) and 6 parts of the foaming agent azodicarbonamide (AC) were added, mixed for 3 min, and then discharged. The rubber mix was plasticated 10 times on an open mill with a roll temperature of 60° C. and a roll gap of 0.4 mm, and then the roll gap was increased to obtain a sheet having a thickness of about 2.2 to 2.5 mm, which was unloaded, and stood for 20 hours.

(2) After vulcanization, various tests were carried out after standing for 16 hrs.

Comparative Example 3

(1) Rubber mixing: The temperature of the internal mixer was set to 90° C., and the rotor speed was set to 50 rpm. 100 parts of EPDM was added, prepressed and mixed for 90 seconds. Then 0.5 part of the crosslinking agent dicumyl peroxide (DCP), and 6 parts of the foaming agent azodicarbonamide (AC) were added, mixed for 3 min, and then discharged. The rubber mix was plasticated on an open mill with a roll temperature of 80° C., and then the roll gap was increased to obtain a sheet having a thickness of about 2.2-2.5 mm, which was unloaded and stood for 20 hours.

2 min. Then 50 parts of carbon black N550, 20 parts of carbon black N330, and 55 parts of paraffin oil SUN-PAR2280 were added, and mixed for 4 min. Finally, 2 parts of the crosslinking agent dicumyl peroxide (DCP), 0.3 part of the assistant crosslinking agent sulfur, 0.5 part of N-cyclohexyl-2-benzothiazole sulfenamide, 0.3 part of tetramethyl thiuram disulfide, and 2 parts of the foaming agent 4,4'-oxydibenzenesulfonyl hydrazide (OBSH) were added, mixed for 3 min, and then discharged. The rubber mix was plasticated on an open mill with a roll temperature of 80° C. and then the roll gap was increased to obtain a sheet having a thickness of about 2.2 to 2.5 mm, which was unloaded, and stood for 20 hours.

(2) After vulcanization, various tests were carried out after standing for 16 hrs.

Comparative Example 5

(1) Rubber mixing: The temperature of the internal mixer was set to 70° C., and the rotor speed was set to 50 rpm. 100 parts of EPDM was added, pre-pressed and mixed for 90 seconds. Then 10 parts of 30# motor oil and 4 parts of vinyl tris(2-methoxyethoxy)silane (A-172) were added, and mixed for 1 min. Next, 50 parts of silica N255 produced by precipitation, 3 parts of polyethylene glycol, and 10 parts of zinc oxide were added sequentially and mixed for 2 min. Finally, 2 parts of the crosslinking agent dicumyl peroxide (DCP) and 6 parts of the foaming agent azodicarbonamide (AC) were added, mixed for 3 min, and then discharged. The rubber mix was plasticated 10 times on an open mill with a roll temperature of 60° C. and a roll gap of 0.4 mm, and then the roll gap was increased to obtain a sheet having a thickness of about 2.2 to 2.5 mm, which was unloaded, and stood for 20 hours.

(2) After vulcanization, various tests were carried out after standing for 16 hrs.

The performance test data is shown in a table below.

| Test Item | Example 7 | Example 8 | Example 9 | Example 10 | Example 11 | Example 12 | Example 13 | Example 14 | Comparative Example 3 | Comparative Example 4 | Comparative Example 5 |
|---|---|---|---|---|---|---|---|---|---|---|---|
| Density/ (g · cm³) | 0.19 | 0.18 | 0.16 | 0.32 | 0.82 | 0.78 | 0.5 | 0.51 | 0.14 | 0.79 | 0.49 |
| Tensile strength/ MPa | 1.2 | 1.4 | 1.5 | 2.3 | 4.4 | 4.6 | 2.9 | 3.4 | 0.7 | 4.1 | 2.6 |
| Elongation at break/% | 523 | 539 | 588 | 416 | 273 | 295 | 517 | 506 | 612 | 286 | 489 |
| Compression set (at 70° C. for 70 h) | 20 | 17 | 16 | 15 | 22 | 20 | 21 | 18 | 24 | 25 | 23 |

(2) After vulcanization, various tests were carried out after standing for 16 hrs.

Comparative Example 4

The processing steps were as follows.

(1) Rubber mixing: The temperature of the internal mixer was set to 90° C., and the rotor speed was set to 50 rpm. 100 parts of EPDM was added, prepressed and mixed for 90 seconds. 5 parts of zinc oxide, 2 parts of stearic acid and 2 parts of the anti-aging agent RD were added and mixed for Data analysis: By comparing Examples 7 to 10 and Comparative Example 3, or by comparing Examples 11 and 12 and Comparative Example 4, or by comparing Examples 13 and 14 and Comparative Example 5, it can be found that with increasing amount of branched polyethylene in place of ethylene-propylene rubber, the tensile strength of the foamed rubber obtained by vulcanization is increased, the compression set is lowered, and the overall performance is improved.

An embodiment of the present invention also relates to use of the rubber composition in the production of foamed materials, including sponge seal strip, foamed material of high expansion ratio, shock-absorbing foamed rubber sheet, and light-colored high-strength foamed sheet, as detailed below.

Example 15

A sponge seal strip was produced through a method comprising the following steps.

(1) Rubber mixing: The temperature of the internal mixer was set to 90° C., and the rotor speed was set to 50 rpm. 100 parts of branched polyethylene PER-5 was added, pre-pressed and mixed for 90 seconds. 10 parts of zinc oxide, and 1 part of stearic acid were added and mixed for 1 min. Then 5 parts of calcium oxide and 2 parts of polyethylene glycol PEG4000 were added and mixed for 1 min. Next, 60 parts of carbon black N550, 50 parts of carbon black N765, and 70 parts of paraffin oil SUNPAR2280 were added in two equal batches to the rubber compound, and mixed for 4 min. Finally, 4 parts of the crosslinking agent dicumyl peroxide (DCP), 1 part of the assistant crosslinking agent triallyl isocyanurate (TAIC), 0.3 part of the assistant crosslinking agent sulfur, 2 parts of the foaming agent azodicarbonamide (AC) and 2 parts of the foaming agent 4,4'-oxydibenzene-sulfonyl hydrazide (OBSH) were added, mixed for 3 min, and then discharged.

(2) The rubber mix was plasticated on an open mill, and the sheet was discharged, cooled, and stood.

(3) The rubber sheet was extruded through an extruder, vulcanized in a salt bath, molded, cooled, punched, and cut.

Example 16

A foamed material of high expansion ratio was produced through a method comprising the following steps.

(1) Rubber mixing: The temperature of the internal mixer was set to 90° C., and the rotor speed was set to 50 rpm. 100 parts of branched polyethylene PER-3 was added, pre-pressed and mixed for 90 seconds. Then 0.5 part of the crosslinking agent dicumyl peroxide (DCP), and 6 parts of the foaming agent azodicarbonamide (AC) were added, mixed for 3 min, and then discharged. The rubber mix was plasticated on an open mill with a roll temperature of 80° C., and then the roll gap was increased to obtain a sheet having a thickness of about 3 mm, which unloaded.

(2) The rubber sheet was pre-molded for 15 min in a mold frame at 70° C. under 5 MPa.

(3) The pre-molded rubber was foamed for 10 min in a mold at 160° C.

(4) The rubber was cooled, and removed from the mold, to obtain a foamed material.

Example 17

A shock-absorbing foamed rubber sheet was produced through a process below.

(1) Rubber mixing: The temperature of the internal mixer was set to 90° C., and the rotor speed was set to 50 rpm. 100 parts of branched polyethylene was added, prepressed and mixed for 90 seconds. 5 parts of zinc oxide, 2 parts of stearic acid and 2 parts of the anti-aging agent RD were added and mixed for 2 min. Then 50 parts of carbon black N550, 20 parts of carbon black N330, and 55 parts of paraffin oil SUNPAR2280 were added, and mixed for 4 min. Finally, 2 parts of the crosslinking agent dicumyl peroxide (DCP), 0.3 part of the assistant crosslinking agent sulfur, 0.5 part of N-cyclohexyl-2-benzothiazole sulfenamide, 0.3 part of tetramethyl thiuram disulfide, and 2 parts of the foaming agent 4,4'-oxydibenzenesulfonyl hydrazide (OBSH) were added, mixed for 3 min, and then discharged.

(2) cooling the discharged rubber mix to below 30° C., plasticating 5 times on an open mill with a roll gap of less than 1 mm, unloading the sheet of 6-8 mm in thickness, and standing for 24 hrs;

(3) feeding the stood rubber mix to an open mill, hot milling, and then discharging the sheet, where the ratio of the thickness of the discharged sheet to the product is 0.6:1, and the temperature during the process is controlled to 65° C. or below;

(4) forming by cutting the hot-milled rubber sheet according to the size of a cavity of a mold after standing for 24 hrs;

(5) filling the cut rubber sheet into the cavity of the mold, and mold vulcanizing for 30 min at a temperature of 165° C.; and (6) thermally releasing from the mold, and trimming, to obtain a foamed rubber sheet product.

Example 18

A light-colored high-strength foamed sheet was produced through a method comprising the following steps.

(1) Rubber mixing: The temperature of the internal mixer was set to 70° C., and the rotor speed was set to 50 rpm. 100 parts of branched polyethylene PER-4 was added, pre-pressed and mixed for 90 seconds. Then 10 parts of 30# motor oil was added, and mixed for 1 min. Next, 50 parts of silica N255 produced by precipitation, 3 parts of polyethylene glycol, and 10 parts of zinc oxide were added sequentially and mixed for 2 min. Finally, 10 parts of the crosslinking agent bis(tert-butylperoxyisopropyl)benzene, 6 parts of the radiation sensitizing assistant crosslinking agent trimethylolpropane trimethacrylate (TMPTMA) and 6 parts of the foaming agent azodicarbonamide (AC) were added, mixed for 3 min, and then discharged. The rubber mix was plasticated 10 times on an open mill with a roll temperature of 60° C. and a roll gap of 0.4 mm, and then the roll gap was gradually increased to obtain a rubber sheet having a thickness of about 5 mm, which was unloaded.

(2) The rubber sheet was stood for over 24 hrs, and then formed by cutting according to the size of a cavity of a mold.

(3) Radiation pre-vulcanization: The cut rubber sheet was fixed on a transmission device under a tension traction-free beam of an electron accelerator for uniform radiation treatment, where the beam energy from the electron accelerator is 10 MeV, the scan width of electron beam is 1 m, the radiation absorption dose of the raw rubber sheet is 30 KGy, the radiation atmosphere is an oxygen-limited environment with an inert gas, and the time required for radiation pre-vulcanization is 2.5 minutes per sheet on average.

(4) High-temperature molding vulcanization and foaming: The raw rubber sheet after radiation pretreatment was vulcanized for 15 min in a vulcanization molding machine at 175° C. under 10 MPa, removed from the mold, naturally cooled, trimmed to obtain a light-colored high-strength foamed sheet.

Example 19

A foam-solid composite seal was produced through a process as follows.

(1) Rubber mixing: The mixing process of the rubber compound used in the foamed portion was the same as that in Example 15.

(2) Multiple extrusion and vulcanization: The rubber mix for the solid portion and the vulcanized rubber for the foamed portion were co-extruded and molded by a multiple extruder, where the temperature of the extruder was set such that the head temperature was 90-100° C., and the screw temperature was 70-80° C., the head pressure was controlled to 15-20 MPa, and the rotation speed of the extruder was 25-30 rpm. A salt bath vulcanization process was employed, where the temperature in the spray section was 250° C., the temperature in the steeping section was 220° C., the temperature in the steeping pressing section was 220° C., the transmission speed was 35-45 m/min, the vulcanization time was 1.5 minutes, and the temperature in the cooling section was 25-30° C.

(3) After cooling, trimming, and cutting, a finished product was obtained.

Example 20

A solid bicycle tire with an inner layer of a foamed elastomer was produced through a process as follows.

Mixing of inner-layer rubber: 100 parts of branched polyethylene PER-4 was added, prepressed and mixed for 90 seconds. 5 parts of zinc oxide, and 1 part of stearic acid were added and mixed for 1 min. Then 5 parts of vaseline, 10 parts of paraffin oil SUNPAR2280, and 20 parts of calcium carbonate were added to the rubber compound, and mixed for 3 min. Finally, 4 parts of the crosslinking agent dicumyl peroxide (DCP), 1 part of the assistant crosslinking agent triallyl isocyanurate (TAIC) 3 parts of the foaming agent soda powder and 2 parts of the assistant crosslinking agent 4,4'-oxydibenzenesulfonyl hydrazide (OBSH) were added, mixed for 2 min, and then discharged. The rubber mix was plasticated on an open mill at 60° C., then a sheet was unloaded, cooled, steeped with a spacer fluid, cooled and stood.

(2) Molding: The rubber mix was added to an extruder, to extrude a round rubber strip of suitable diameter. The round rubber strip was cut to have a length as required by the process, two ends of which were joined to obtain a semi-finished foaming rubber strip.

(3) Foaming vulcanization: The semi-finished foaming rubber strip was mounted on a mold, a finished outer tire was sleeved, evenly pierced at the top at an interval of 2.5 to 4 cm with a steel needle having a diameter of 2 mm, and then vulcanized and foamed for 30 min in a vulcanization oven at a temperature of 160° C. The foamed inner tire and the outer tire were bonded together to achieve an inflation-free and anti-nail-proof tire.

Example 21

A solid bicycle tire with an inner layer of a foamed elastomer was produced through a process as follows.

(1) Mixing of inner-layer rubber: 50 parts of branched polyethylene PER-3 and 50 parts of branched polyethylene PER-11 were added, prepressed and mixed for 90 seconds. 5 parts of zinc oxide, and 1 part of stearic acid were added and mixed for 1 min. Then 5 parts of vaseline, 10 parts of paraffin oil SUNPAR2280, and 20 parts of calcium carbonate were added to the rubber compound, and mixed for 3 min. Finally, 4 parts of the crosslinking agent dicumyl peroxide (DCP), 1 part of the assistant crosslinking agent triallyl isocyanurate (TAIC) 3 parts of the foaming agent soda powder and 2 parts of the assistant crosslinking agent 4,4'-oxydibenzenesulfonyl hydrazide (OBSH) were added, mixed for 2 min, and then discharged. The rubber mix was plasticated on an open mill at 60° C., then a sheet was unloaded, cooled, steeped with a spacer fluid, cooled and stood.

(2) Molding: The rubber mix was added to an extruder, to extrude a round rubber strip of suitable diameter. The round rubber strip was cut to have a length as required by the process, two ends of which were joined to obtain a semi-finished foaming rubber strip.

(3) Foaming vulcanization: The semi-finished foaming rubber strip was mounted on a mold, a finished outer tire was sleeved, evenly pierced at the top at an interval of 2.5 to 4 cm with a steel needle having a diameter of 2 mm, and then vulcanized and foamed for 30 min in a vulcanization oven at a temperature of 160° C. The foamed inner tire and the outer tire were bonded together to achieve an inflation-free and anti-nail-proof tire.

Example 22

A light-colored high-strength foamed sheet was produced through a method comprising the following steps.

(1) Rubber mixing: The temperature of the internal mixer was set to 70° C., and the rotor speed was set to 50 rpm. 100 parts of branched polyethylene PER-10 was added, prepressed and mixed for 90 seconds. Then 20 parts of 30# motor oil was added, and mixed for 1 min. Next, 50 parts of silica N255 produced by precipitation, 3 parts of polyethylene glycol, and 10 parts of zinc oxide were added sequentially and mixed for 2 min. Finally, 10 parts of the crosslinking agent bis(tert-butylperoxyisopropyl)benzene, 6 parts of the radiation sensitizing assistant crosslinking agent trimethylolpropane trimethacrylate (TMPTMA) and 6 parts of the foaming agent azodicarbonamide (AC) were added, mixed for 3 min, and then discharged. The rubber mix was plasticated 10 times on an open mill with a roll temperature of 60° C. and a roll gap of 0.4 mm, and then the roll gap was gradually increased to obtain a rubber sheet having a thickness of about 5 mm, which was unloaded.

(2) The rubber sheet was stood for over 24 hrs, and then formed by cutting according to the size of a cavity of a mold.

(3) Radiation pre-vulcanization: The cut rubber sheet was fixed on a transmission device under a tension traction-free beam of an electron accelerator for uniform radiation treatment, where the beam energy from the electron accelerator is 10 MeV, the scan width of electron beam is 1 m, the radiation absorption dose of the raw rubber sheet is 30 KGy, the radiation atmosphere is an oxygen-limited environment with an inert gas, and the time required for radiation pre-vulcanization is 2.5 minutes per sheet on average.

(4) High-temperature molding vulcanization and foaming: The raw rubber sheet after radiation pretreatment was vulcanized for 15 min in a vulcanization molding machine at 175° C. under 10 MPa, removed from the mold, naturally cooled, trimmed to obtain a light-colored high-strength foamed sheet.

Example 23

A sponge seal strip was produced through a method comprising the following steps.

(1) Rubber mixing: The temperature of the internal mixer was set to 90° C., and the rotor speed was set to 50 rpm. 100 parts of branched polyethylene PER-12 was added, prepressed and mixed for 90 seconds. 10 parts of zinc oxide, and 1 part of stearic acid were added and mixed for 1 min. Then 5 parts of calcium oxide and 2 parts of polyethylene glycol PEG4000 were added and mixed for 1 min. Next, 60 parts of carbon black N550, 60 parts of carbon black N765, and 70 parts of paraffin oil SUNPAR2280 were added in two equal batches to the rubber compound, and mixed for 4 min. Finally, 4 parts of the crosslinking agent dicumyl peroxide (DCP), 1 part of the assistant crosslinking agent triallyl isocyanurate (TAIC), 0.3 part of the assistant crosslinking agent sulfur, 2 parts of the foaming agent azodicarbonamide (AC) and 2 parts of the foaming agent 4,4'-oxydibenzene-sulfonyl hydrazide (OBSH) were added, mixed for 3 min, and then discharged.

(2) The rubber mix was plasticated on an open mill, and the sheet was discharged, cooled, and stood.

(3) The rubber sheet was extruded through an extruder, vulcanized in a salt bath, molded, cooled, punched, and cut.

The foamed sample prepared with the formulation used in this example has a tensile strength of 3.2 MPa, an elongation at break of 353%, and a compression set of 15% at 70° C. for 70 h.

What is claimed is:

1. A rubber composition, comprising a rubber matrix and essential components, wherein, based on 100 parts by weight of the rubber matrix, the rubber matrix comprises a branched polyethylene with a content represented as A, in which $10 \leq A < 100$ and an ethylene-propylene monomer (EPM) and an ethylene-propylene-diene monomer (EPDM) with a total content represented as B, in which $0 < B \leq 90$ parts; and based on 100 parts by weight of the rubber matrix, the essential components comprises 0.5-10 parts of a crosslinking agent, and 1.5-25 parts of a foaming agent, wherein, the branched polyethylene comprises an ethylene homopolymer having:

a degree of branching of from 60 to 70 branches/1000 carbon atoms, a secondary branch structure, a methyl branch content of from 66.5 to 68.1 mol %, an ethyl branch content of from 7.1 to 7.2 mol %, a propyl branch content of from 4.2 to 4.6 mol %, a butyl branch content of from 2.7 to 3.2 mol %, a pentyl branch content of from 2.8 to 3.2 mol %, a weight average molecular weight of from 436,000 to 518,000, and a Mooney viscosity ML (1+4) at 125° C. of from 93 to 102, wherein the branched polyethylene is obtained by catalytic homopolymerization of ethylene in the presence of an α-diimine nickel catalyst.

2. The rubber composition according to claim 1, wherein the crosslinking agent comprises at least one of a peroxide crosslinking agent and sulfur, wherein the peroxide crosslinking agent comprises at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy) hexane, 2,5-dimethyl-2,5-di(tert-butylperoxy) hexyne-3, bis(tert-butylperoxyisopropyl)benzene, 2,5-dimethyl-2,5-bis(benzoylperoxy) hexane, tert-butyl peroxybenzoate, and tert-butylperoxy-2-ethylhexyl carbonate.

3. The rubber composition according to claim 1, wherein the foaming agent comprises at least one of sodium bicarbonate, azodicarbonamide (AC), dinitrosopentylenetetramine (H), 4,4'-oxydibenzenesulfonyl hydrazide (OBSH), benzenesulfonyl hydrazide (BSH), urea, and a low-boiling point hydrocarbon foaming agent in the form of microcapsules.

4. The rubber composition according to claim 1, further comprising auxiliary components, which comprise, based on 100 parts by weight of the rubber matrix, 0.2 to 10 parts of an assistant crosslinking agent, 30 to 200 parts of a reinforcing filler, 10 to 100 parts of a plasticizer, 1 to 3 parts of a stabilizer, 2 to 20 parts of a metal oxide, 3 to 7 parts of a silane coupling agent, 1 to 5 parts of polyethylene glycol, 0.5 to 3 parts of stearic acid and 0 to 3 parts of a vulcanization accelerator.

5. The rubber composition according to claim 4, where the silane coupling agent comprises at least one of vinyl tris(2-methoxyethoxy) silane (A-172), γ-glycidoxypropylt-rimethoxysilane (A-187) and γ-mercaptopropyltrimethox-ysilane (A-189); the stabilizer comprises at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB); the assistant crosslinking agent comprises at least one of triallyl cyanurate, triallyl isocyanurate, ethylene glycol dimethacrylate, triethylene glycol dimethacrylate, triallyl trimellitate, trimethylolpropane trimethacrylate, N,N'-m-phenylene bismaleimide, N,N'-bis(furfurylidene) acetone, 1,2-polybutadiene, a metal salt of an unsaturated carboxylic acid, and sulfur; the plasticizer comprises at least one of pine tar, motor oil, naphthenic oil, paraffin oil, coumarone, RX-80, vaseline, and paraffin; the metal oxide comprises at least one of zinc oxide, magnesia, and calcium oxide; the reinforcing filler comprises at least one of carbon black, silica, calcium carbonate, talc, calcined clay, magnesium silicate, and magnesium carbonate; the vulcanization accelerator comprises at least one of 2-mercaptobenzothiazole, dibenzothiazyl disulfide, tetramethyl thiuram monosulfide, tetramethyl thiuram disulfide, tetraethyl thiuram disulfide, N-cyclohexyl-2-benzothiazole sulfenamide, N,N-dicyclohexyl-2-benzothiazole sulfenamide, bismaleimide, and ethylene thiourea.

6. A solid cycle tire internally filled with a foamed elastomer, wherein, the rubber compound used for the internally filled foamed elastomer comprises said rubber composition according to claim 1.

7. A foamed rubber product, wherein, the rubber compound used for said foamed rubber product comprises said rubber composition according to claim 1.

8. The foamed rubber product according to claim 7, wherein, said foamed rubber product is a sponge seal strip, wherein, the rubber compound used for said sponge seal strip comprises said rubber composition.

9. The foamed rubber product according to claim 7, wherein, said foamed rubber product is a shock-absorbing foamed rubber sheet, wherein the rubber compound used comprises said rubber composition.

10. The foamed rubber product according to claim 7, wherein, said foamed rubber product is a foam-solid composite seal strip, wherein the rubber compound used in the formed portion of the foam-solid composite seal strip comprises said rubber composition.

11. A rubber composition, comprising a rubber matrix and essential components, wherein, based on 100 parts by weight of the rubber matrix, the rubber matrix comprises:

a branched polyethylene with a content represented as A, in which $10 \leq A \leq 100$ parts, and, optionally, an ethylene-propylene monomer (EPM) and an ethylene-propylene-diene monomer (EPDM) with a total content represented as B, in which $0 \leq B \leq 90$ parts;

wherein, based on 100 parts by weight of the rubber matrix, the essential components comprises 0.5-10 parts of a crosslinking agent and 1.5-25 parts of a foaming agent;

wherein, the branched polyethylene comprises an ethylene homopolymer having:

a degree of branching of from 60 to 70 branches/1000
  carbon atoms;

a secondary branch structure;

a methyl branch content of from 66.5 to 68.1 mol %;

an ethyl branch content of from 7.1 to 7.2 mol %;

a propyl branch content of from 4.2 to 4.6 mol %;

a butyl branch content of from 2.7 to 3.2 mol %;

a pentyl branch content of from 2.8 to 3.2 mol %;

a weight average molecular weight of from 436,000 to
  518,000; and a Mooney viscosity ML (1+4) at 125° C. of from 93 to
  102; and wherein the branched polyethylene is obtained by cata-
  lytic homopolymerization of ethylene in the presence
  of an α-diimine nickel catalyst.

\* \* \* \* \*